Aug. 24, 1965  J. P. LE BEL ETAL  3,202,383
AIRCRAFT
Filed Oct. 25, 1961  6 Sheets-Sheet 1
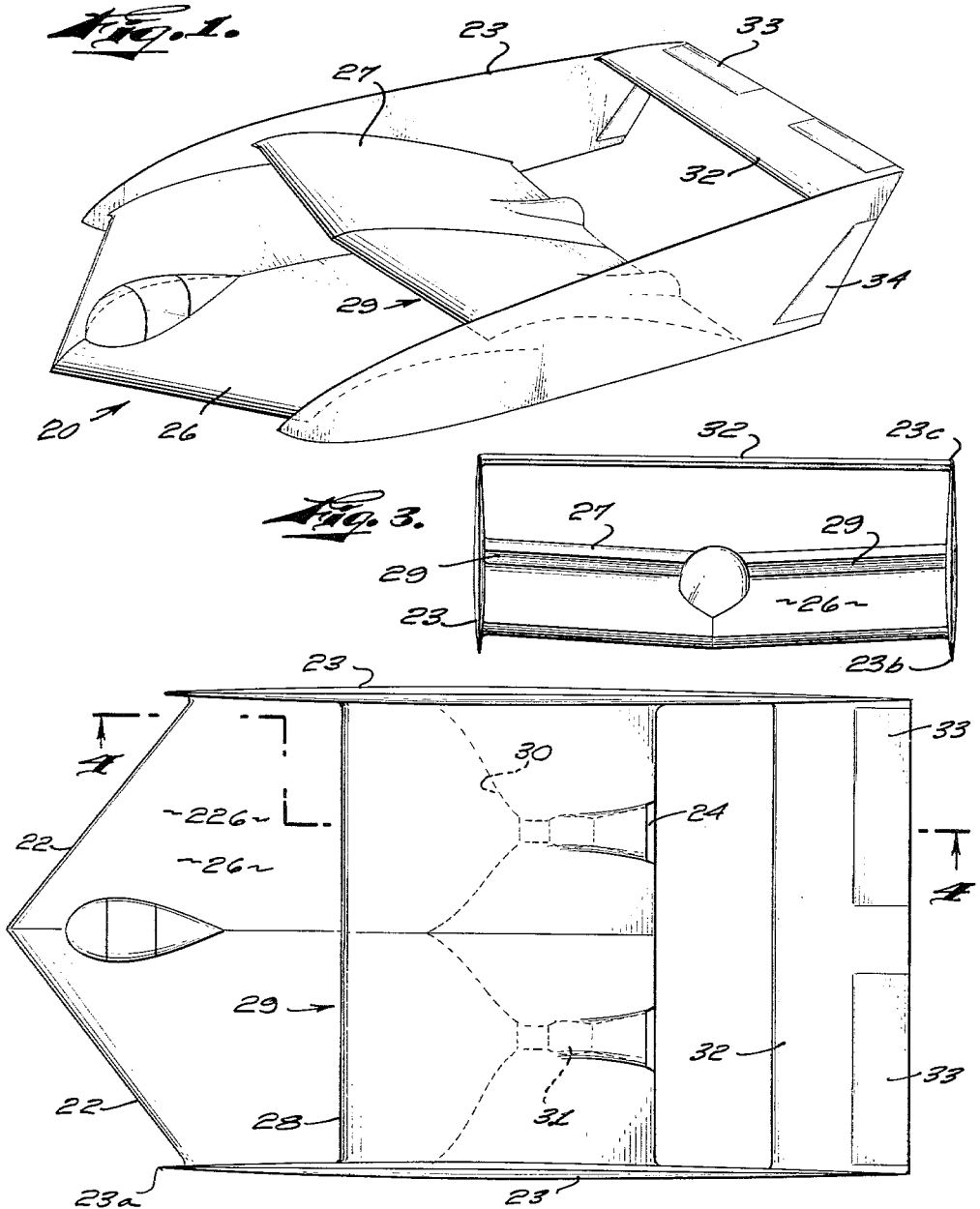
INVENTORS
HUGH E. NICHOLS
JOHN P. LE BEL
BY FULWIDER, MATTINGLY
& HUNTLEY
ATTORNEYS

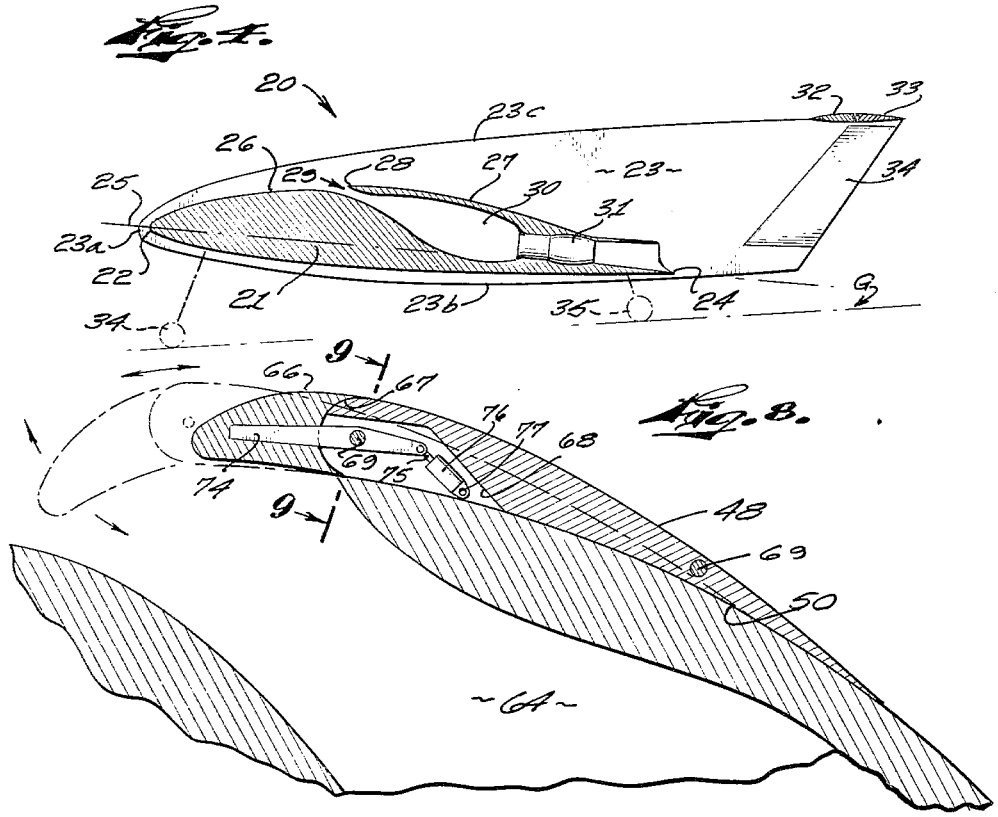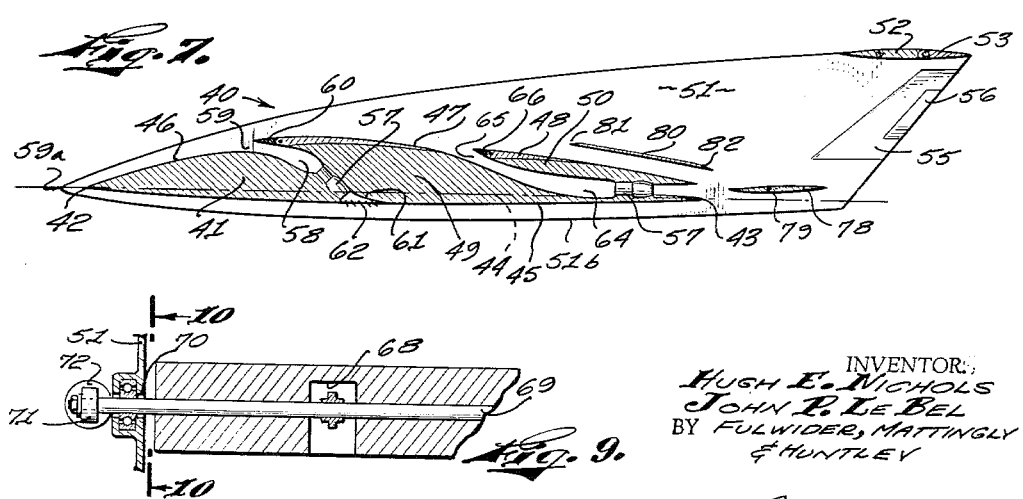

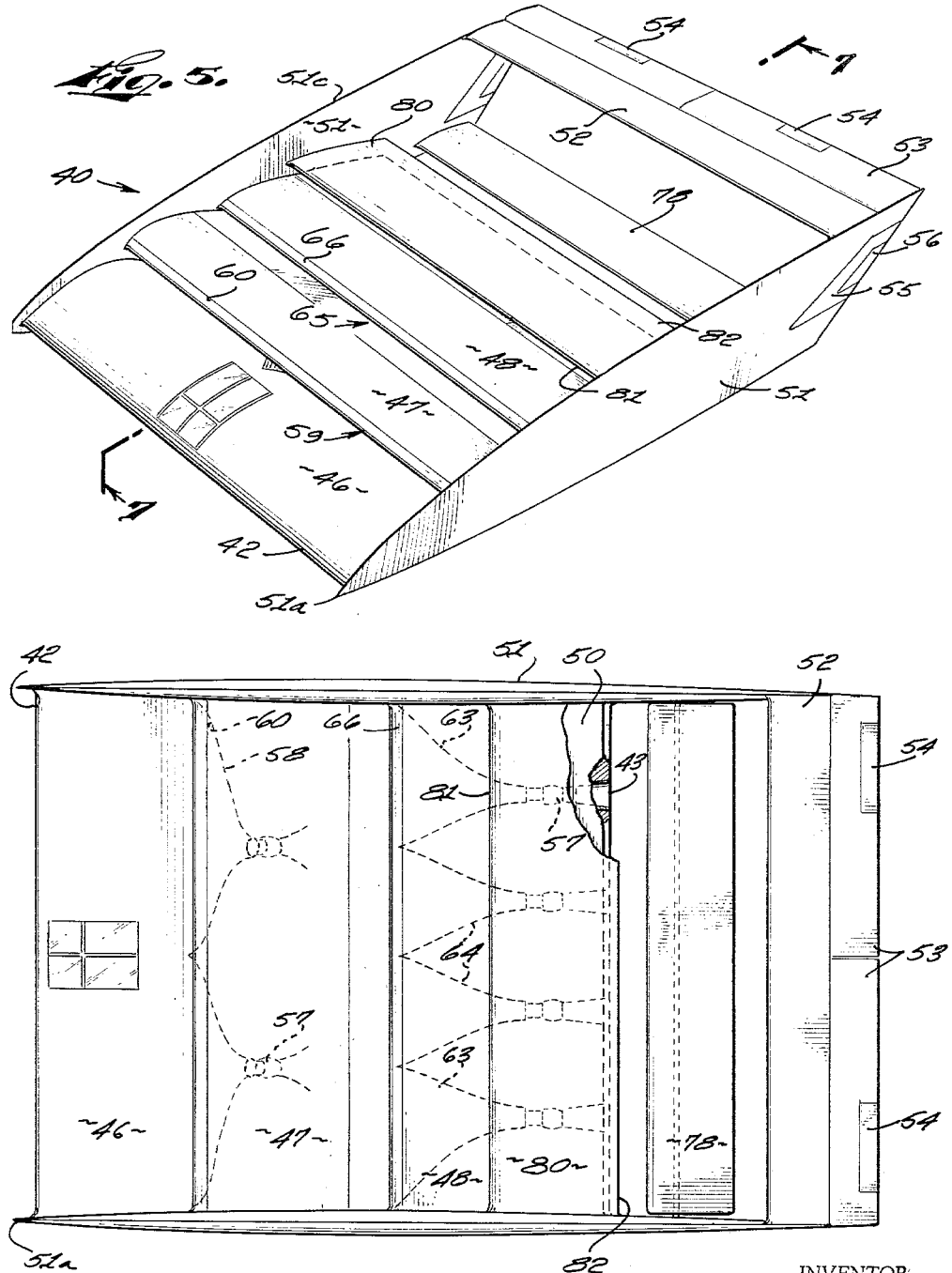

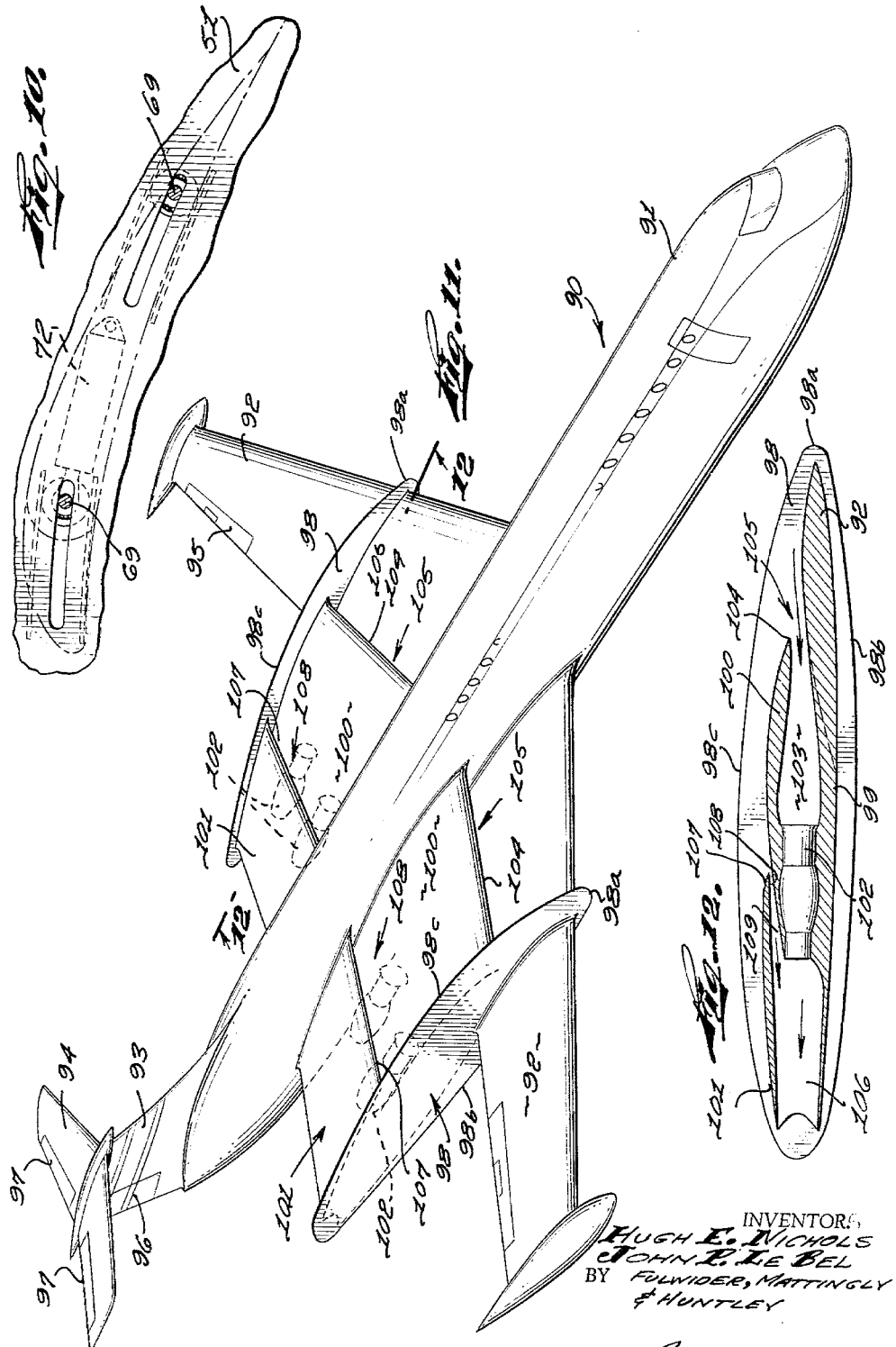

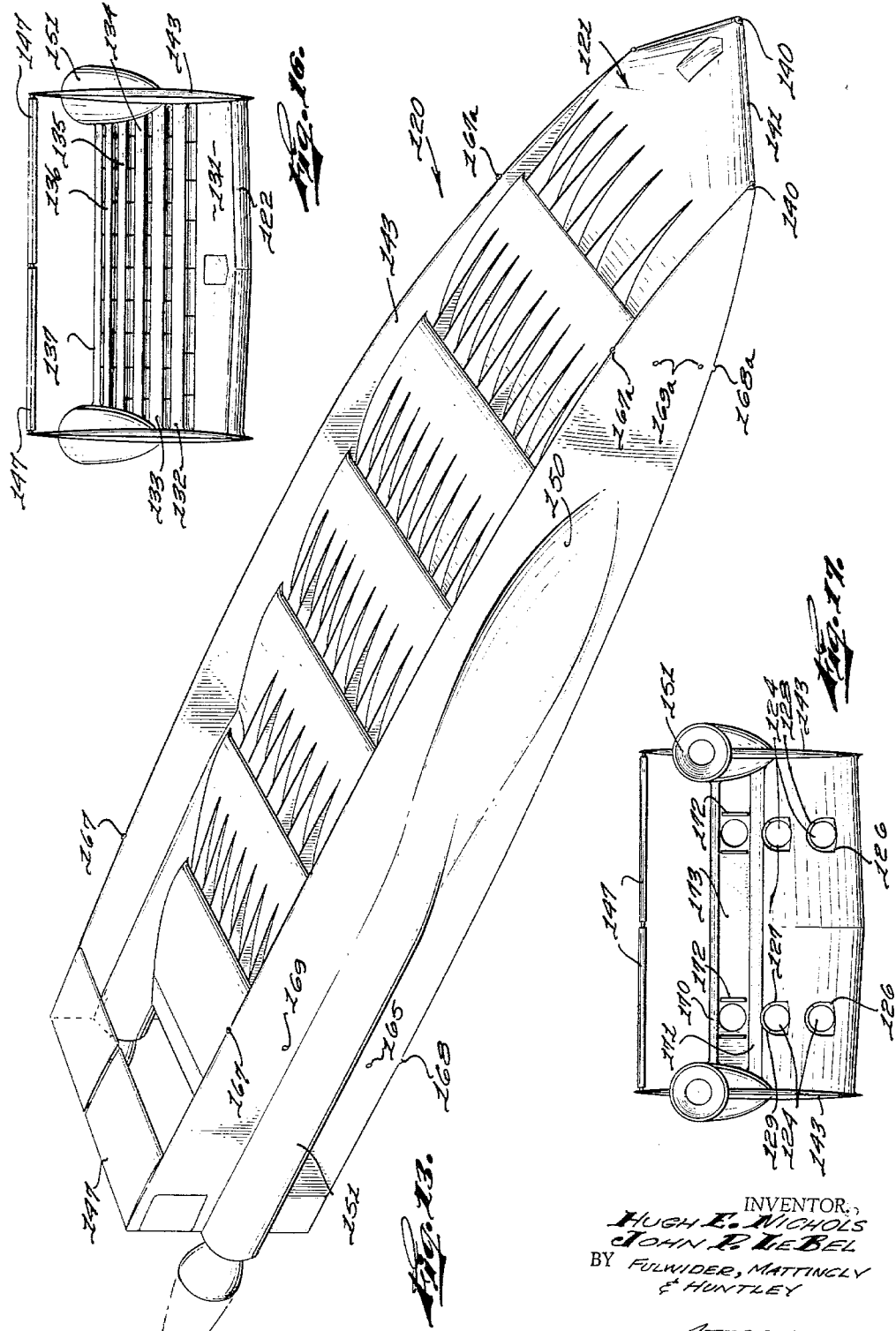

Aug. 24, 1965 J. P. LE BEL ETAL 3,202,383
AIRCRAFT
Filed Oct. 25, 1961 6 Sheets-Sheet 6
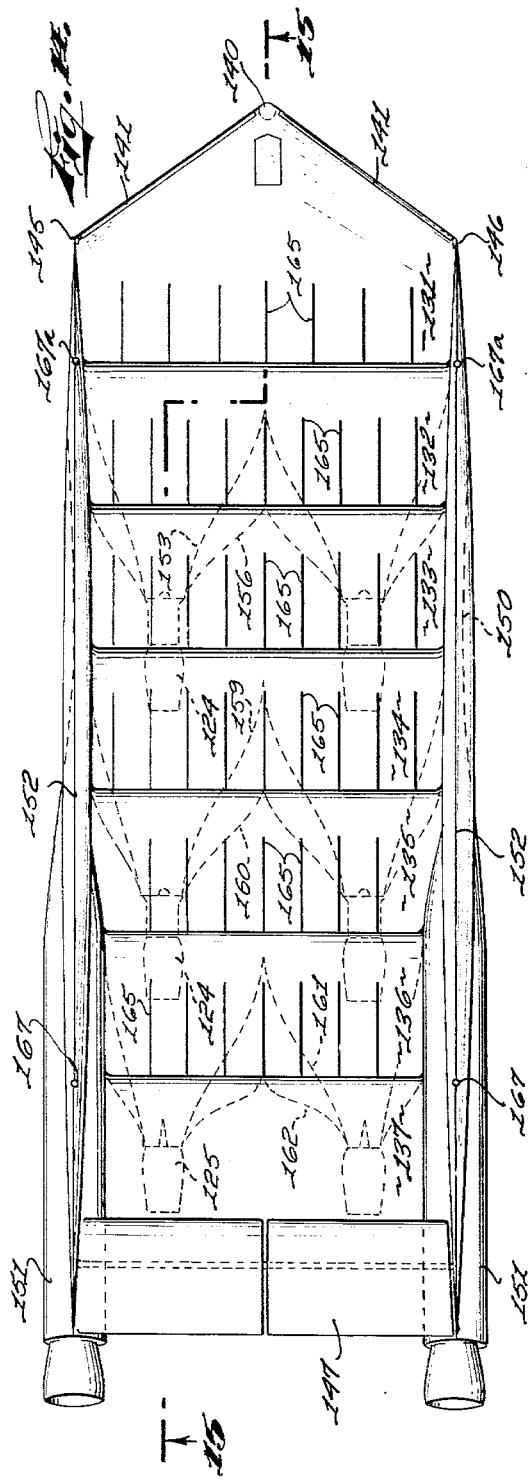
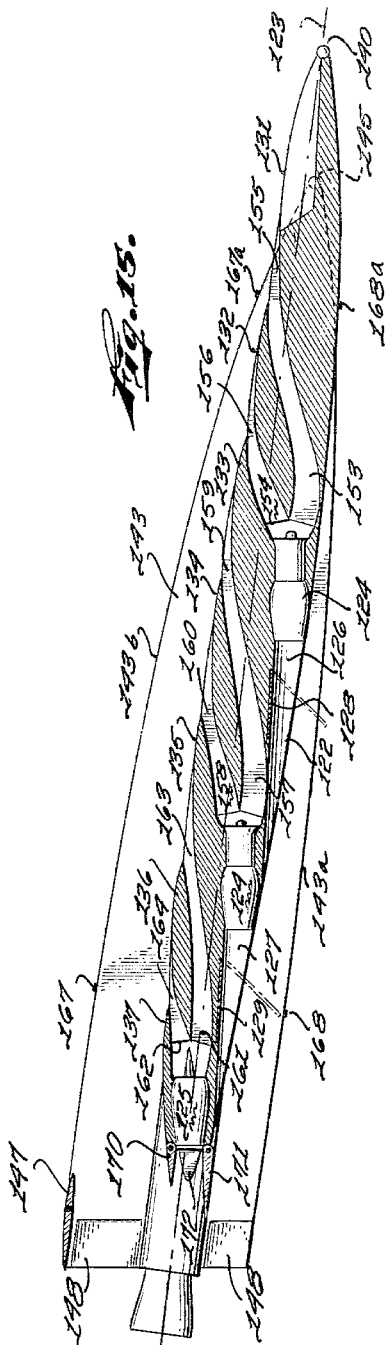
INVENTORS
HUGH E. NICHOLS
JOHN P. LE BEL
BY FULWIDER, MATTINGLY
& HUNTLEY
ATTORNEYS United States Patent Office 3,202,383
Patented Aug. 24, 1965

3,202,383
AIRCRAFT
John P. Le Bel, 1948 E. 5th Ave., Mesa, Ariz., and
Hugh E. Nichols, Rte. 1, Box 16, Higley, Ariz.
Filed Oct. 25, 1961, Ser. No. 147,526
11 Claims. (Cl. 244—42)

This invention relates generally to aircraft and, particularly, to aircraft of the "flying wing" type, although having features of novelty which are of utility in other configurations of aircraft.

Broadly, it is an object of our invention to provide an aircraft having superior performance characteristics in all regimes of flight in the sensible atmosphere, i.e., in subsonic, trans-sonic, supersonic and hypersonic flight.

More specifically, it is among the objects of our invention to provide a novel boundary layer control means for improving slow speed and high speed characteristics of the aircraft in which used. Our boundary layer control means utilizes either or both the intake and exhaust of an air breathing engine to avoid boundary layer separation to increase the lift produced by the wing of the aircraft. This boundary layer control means is achieved by a relationship of engine mounting and ducting relative to a cascade series of airfoil surfaces to eliminate the requirements of extensive ducting, auxiliary blowing or sucking apparatus, and intricate arrangements of slotting employed with prior art devices.

It is also an important object of the invention to provide a feasible configuration of low aspect ratio flying wing type of aircraft, in order to realize the long recognized advantages of the flying wing configuration. Heretofore, it has been assumed, generally, that a flying wing configuration would not be feasible if having an aspect ratio of less than four or five, primarily because of a supposed inability to efficiently produce sufficient lift and, also, because of assumed improbability of producing an aircraft which would be stable about all three axes. However, we have devised a low aspect ratio aircraft which is aerodynamically efficient in the production of lift, even with aspect ratios far less than four, this result being achieved, in large part, becaues of our novel boundary layer control means. As to the supposed difficulty in devising a stable low aspect ratio flying wing aircraft, the problems of stability about the pitch and yaw axes, found in relatively high aspect ratio flying wing aircraft, have been simplified by our low aspect ratio configuration, which configuration also achieves positive control about the longitudinal axis.

Yet another object of the invention is to provide a low aspect ratio flying wing type of aircraft with high-lift, low speed characteristics so as to achieve a steep gradient low speed landing approach, as well as a steep gradient ascent after a relatively short takeoff roll.

The invention also has for a broad object the provision of an orbital vehicle that is self-lifting through subsonic, trans-sonic, supersonic and hypersonic flight regimes to the outer limit of the sensible atmosphere as a winged vehicle, with a rocket boost into orbital flight outside the sensible atmosphere, and capable of controlled return as a lifting re-entry vehicle. Thus, the invention makes possible a low total system cost due to retrieval of the entire vehicle. In this respect, the invention is broadly distinguishable from conventional rocket lifting of a vehicle into orbital flight and the ballistic re-entry of the vehicle, which conventional system involves the permanent loss of lower rocket stages, chance retrieval of the vehicle payload and uncontrolled ballistic re-entry.

The foregoing and numerous other more specific objects and advantages of our invention will be apparent from the following description of several illustrative embodiments thereof, when taken in conjunction with the annexed drawings.

FIGURES 1, 2 and 3 are perspective, top plan, and front elevational views, respectively, of an aircraft embodying our invention;

FIGURE 4 is a sectional view taken on the line 4—4 of FIGURE 2;

FIGURES 5 and 6 are a perspective and a top plan view, respectively, of an alternative embodiment of our invention;

FIGURE 7 is a sectional view taken on the direction of the lines 7—7 of FIGURE 5;

FIGURE 8 is a sectional view, on an enlarged scale, of a portion of the intake duct adjustment of the forward bank of engines of the aircraft of FIGURE 7;

FIGURE 9 is a sectional view taken in the direction of the line 9—9 of FIGURE 8, showing additional details of construction of the intake duct adjustment.

FIGURE 10 is a partial sectional view taken on the line 10—10 of FIGURE 9;

FIGURE 11 is a perspective view of a high aspect ratio wing, conventional fuselage type of aircraft incorporating our invention;

FIGURE 12 is a sectional view on the line 12—12 of FIGURE 11;

FIGURE 13 is a perspective view of an orbital vehicle configuration embodying our invention;

FIGURE 14 is a top plan view of the vehicle shown in FIGURE 13;

FIGURE 15 is a sectional view taken on the line 15—15 of FIGURE 14.

FIGURE 16 is a front end elevational view of the vehicle of FIGURE 13.

FIGURE 17 is a rear end elevational view of the vehicle of FIGURE 13.

Referring to the drawings, and in particular to FIGURE 1, one embodiment of our invention is designated generally by the numeral 20. The aircraft 20 has no fuselage, in the sense of a compartment distinguishable from the wing and serving only the purpose of containing the payload, as distinguished from a portion which contributes significant lift. In the aircraft 20 the fuselage or payload compartment comprises an integral part of the wing 21 of generally rectangular planform, except for a pair of swept leading edges 22. On opposite sides, the wing 21 is bounded by large end plates 23 and the wing has a sharp trailing edge 24 disposed normally to the line of flight and longitudinal axis of symmetry.

The wing profile shown in FIGURE 4 may be taken as substantially basic, that is, the wing profiles at all stations from root to tip are substantially similar, except for the planform taper to accommodate the swept leading edges 22. While the two halves of the wing may be "washed out" so that the wing structure is given a forward twist to cause the chords of the wing sections to progressively decrease in angle of attack from root to tip, so as to enhance stability about the longitudinal axis of the aircraft 20, in the present case a constant angle of attack and no "washing out" is shown.

It will be seen that the root section of the wing 21 is relatively long and capable of giving sufficient depth in the central portion of the wing to make it large enough to accommodate an occupant or occupants. Conventionally, it is assumed that the permissible thickness of an airfoil is limited by the chord length and is expressed as a percentage of chord length. With our invention, the thickness can be increased to well above the 20% level because of the cascade configuration of the overall upper camber surface of the wing 21.

As a reference, a line 25 has been shown in FIGURE 4, being the chord of the arc of the bottom camber of the wing 21 and not a mean chord or camber line. Illustratively, the chord line 25 (and its counterpart in the other embodiments of the invention) approximately shows a positive angle of attack of the wing to normally produce a resultant line of center of pressure at about 25% of the chord line, this resultant consisting of the lift produced by cascade airfoils 26 and 27, each with its own line of center of pressure, that define the top surface of the wing 21. In this description and the claims, the word "airfoil" is used synonymously with "surface," and the supporting structure including the airfoil surface is referred to as an "airfoil section." The invention is not limited as to the profiles of the bottom surface of the wing or the profile of the top airfoils but the top airfoils 26 and 27 together should define a top camber, chordwise of the top surface as a whole.

The trailing airfoil section 27 has a leading edge 28, positioned in spaced relation to a confronting portion of the leading surface 26, to define an air scoop 29. This air scoop extends spanwise throughout the width of the wing 21 and forms a ram scoop, as distinguished from a slot or flush inlet, into a pair of ducts 30 for a pair of turbojet engines 31 shown schematically, carried within the wing 21, equidistantly on opposite sides of the longitudinal axis of symmetry.

In our invention, the loss of momentum in the boundary layer of a leading airfoil surface is prevented by utilizing the boundary layer as engine intake air. Thus, in the aircraft 20, the leading edge 28 of the trailing airfoil 27 is positioned in advance of the separation point of the boundary layer flowing across the leading surface 26. With this arrangement, laminar flow is maintained on all portions of the leading surface 26 between the leading edges 22 and at least as far back as the leading edge 28 of the trailing surface 27. As the local velocity at any point on the leading surface 26 is a function of the air speed of the aircraft 20 and, also, a function of the rate of flow of engine air sucked in through the ram intake opening 29, the local free stream velocity across the leading surface 26 is significantly greater than the true air speed of the aircraft 20. This arrangement achieves a significant increase in the lift produced. Thus, if the aircraft 20 be visualized as standing motionless on the ground but with the engines 31 in operation, a lift force will be present on the leading surface 26 even though the aircraft is motionless. Accordingly, a reduction in the necessary length of takeoff roll is accomplished and a relatively steep gradient climb can be achieved. Conversely, a steep gradient landing approach is also achieved and a reduced landing roll, because the relative wind velocity cross the leading surface 26 is significantly greater than the true air speed of the aircraft.

The ducts 30 are of suitable supersonic diffuser configuration to meet the airflow schedule of the engines 31. However, it will be noted that the placement of the engines under the trailing surface 27 and behind the ram intake 29 provides a relatively efficient duct configuration between the rectangular intake and the engine. As the airfoil section 27 is higher than a prolongation of the profile of the exposed surface of the airfoil 26, the top wall of the duct avoids abrupt turning of the airflow and so avoids boundary layer separation from the upper duct wall during diffusion. Similarly, referring to the plan view of FIGURE 2, it will be seen that the engines 31 can be placed sufficiently far back from the ram intake 29 to achieve a duct length in which relatively sharp turns can be minimized.

Arbitrarily, the boundary layer is conventionally considered to have a local thickness which is that distance from the wall or boundary where the velocity or flow in the boundary layer reaches 99% of the local free stream velocity. In the aircraft 20, if the leading edge 28 of the trailing surface 27 be spaced too far above the confronting portion of the leading surface 26, the effectiveness of the engines 31 in sucking the boundary layer into the duct 30 will be reduced. Accordingly, it is preferable to position the leading edge 28 as close as possible to the 99% level of the local thickness of the boundary layer, at the intake 29 and, in any event, forwardly of the separation point of the boundary layer established by the leading surface 26. With this arrangement, the engines 31 are made to depend on the intake of the boundary layer for their operation, and continuous removal or intake of the boundary layer is insured. Obviously, the particular location of the leading edge 28 with respect to the chord of the preceding airfoil is determined by the particular profile of the leading surface. For example, while the wing 21 has been illustrated as having a high overall thickness to chord ratio, which is appropriate for the flying wing configuration, it is to be understood that other wing profiles can be used. As different profiles have different points of boundary layer separation, the position of the leading edge of the trailing airfoil surface will accordingly be varied.

If the wing 21 in FIGURE 4 be visualized as having a smooth unbroken upper camber, as though the surfaces 26 and 27 were blended together, the result would be a profile having but a single center of lift. Conventionally, the center of lift is conceived as the resultant of all unit lift forces along the chord, each of these forces being different in magnitude in accordance with its position along the chord. The larger of these forces are located relatively forwardly on the upper camber, reflecting the fact that the forwardmost unit areas, at about 20% to 25% of the chord of the upper camber contribute more to the resultant lift than those units of area in rear positions. Therefore, as regards the profile of the wing 21 shown in FIGURE 4, the leading surface 26 has a resultant lift distinct from the resultant lift of the trailing surface 27. Furthermore, while the trailing surface 27 has rear chord units of area, which contribute less to the resultant lift of the surface 27 than the more forward chord units of area of the surface 27, the leading surface 26 has no exposed area behind the leading edge 28 and only relatively efficient forward chord units of area of the surface 26 exist. Accordingly, considered as a whole, the wing 21 has a significantly higher lift by virtue of the arrangement of leading and trailing upper camber surfaces, separated by the intake 29, than would be the case if the upper camber of the wing were completely unbroken, like a conventional profile.

In spite of the low aspect ratio of the aircraft 20, an efficient lift to drag ratio is achieved by the wing end plates 23. Were it not for the end plates, the high lift achieved by the novel configuration of the upper camber of the wing 21 would, in large part, be dissipated by the induced drag of the low aspect ratio. However, the end plates 23 prevent any significant formation of wing tip eddies and consequent reduction in relatively high impact pressure on the bottom camber of the wing 21. As the plates 23 are larger in chord depth and length than the tips of the wing 21, the result is an effective aspect ratio 2 or 3 times larger than the actual aspect ratio of the wing 21 and the induced drag coefficient of wing 21 is less than the induced drag coefficient of an unfenced low aspect ratio wing.

More specifically, the end fences or wing tip plates 23, which also serve as vertical stabilizers, have a leading edge 23a, lying on a forward projection of the chord line 25 of the tip section, positioned forwardly of the leading edge 22 of the wing 21. The end plates 23 have a bottom profile 23b geometrically similar to the bottom profile of the wing 21 and, preferably, uniformly spaced from the lower surface of the wing 21. The plates 23 have an upper profile 23c offset upwardly from the top of the wing 21, considered as a whole, and which may be of similar configuration to the overall of composite top profile of the wing 21. However, it is preferred that the top profile 23c gradually increase rearwardly in spacing above the top of the wing 21 so as to give a larger mean vertical span of the end plate 23, since a larger mean vertical span for the end plates increases the effective aspect ratio of the wing 21.

At the rear ends of the fences 23, a horizontal stabilizer 32 is fixedly mounted on the upper edge 23c. To control the aircraft 20 about its roll and pitch axes, a pair of elevons 33 are conventionally mounted in the trailing edge portion of the horizontal stabilizer 32. For guiding the aircraft about its yaw axis, the trailing edge of each of the plates 23 has a conventionally mounted rudder 34.

In high aspect ratio flying wing aircraft, it has been the objective to eliminate vertical and horizontal stabilizers to achieve what is called a tailless aircraft, the theory being that the use of large vertical and horizontal stabilizers so radically increases the parasite drag as to overcome the advantages otherwise attainable with the flying wing craft. With this design objective for tailless aircraft, at has been relatively simple to provide stability about the roll axis, merely by the provision of suitable dihedral in the flying wing, but on the other hand, very difficult problems were created as to controlling or stabilizing the aircraft about its pitch and yaw axes. Our low aspect ratio flying wing configuration incorporates large vertical and horizontal stabilizers, but as has been noted, the result is to preserve the high lift characteristic of the wing 21 with its separate leading and following surface 26 and 27. By doing so, the problems of stability about the pitch and yaw axes are very readily and conventionally taken care of by the relatively long lever arms between the aerodynamic center of the wing 21 and the pitch and yaw control surfaces. This leaves only the matter of control about the roll axis to be considered, and control about this axis is generally recognized to be least difficult.

More specifically, the wing tip plates 23 trail well beyond the trailing edge 24 of the flying wing 21 so that the elevons 33 and rudders 34 are far behind the aerodynamic center of the wing 21. Accordingly, stability about the pitch axis is conventionally attained by setting the horizontal stabilizer 32 at a smaller or perhaps negative aerodynamic angle of attack than the wing so that the stabilizer 32 acts through the long lever of the plates 23 to hold the wing 21 at the proper angle of attack. Then, if the aircraft 20 noses up or down, the lift on the stabilizer 32 becomes more positive or negative and the aircraft is then restored to normal attitude. Additionally, the end plates 23 function as vertical stabilizers to achieve stability in yaw and this yaw stability may be enhanced by "toeing in" preferably at the rear ends of the end plates 23. Additionally, the plates 23 give a very large keel effect which aids yaw stability and stability about the roll axis of the aircraft 20. The keel effect may be considered as acting approximately in the center of the area of the plates 23 and above the center of gravity of the aircraft 20, whereby a righting moment restoring the airplane to even keel is brought into play to give roll stability.

In addition to the keel effect, stability about the roll axis is achieved through the use of dihedral in the wing 21, the dihedral being best seen in FIGURE 3. Added to this is the sweepback of the leading edges 22. Thus, it will be seen that this sweepback, dihedral and the keel effect all combined to achieve stability about the roll axis.

FIGURE 4 illustrates a suitable attitude for the aircraft 20 relative to a ground supporting surface indicated at G. A nose wheel 34 and one of a pair of main wheels 35 are schematically indicated, it being understood, of course, that a tricycle landing gear arrangement is supposed with the nose wheel 34 being disposed on the longitudinal axis of the aircraft 20. It is to be noted that the aircraft at rest is supported with a relatively large angle of attack of the wing 21 and it is particularly to be noted that the lower edges 23b of end plates 23 are spaced well above the ground G. In this connection, the provision of adequate clearance between the lower edges 23b of the end plates 23 and the ground G is of considerable importance in preventing increase of induced drag at a radical rate as the aircraft 20 moves away from the ground. When a wing is flying close to the ground it tends to float because of the ground effect phenomenon, the induced drag of the wing being lowered and accounting for the floating both in landing and taking off. The requirement of clearance between the lower edges of the end plates and the ground G is to avoid defining a complete duct between the ground and the bottom surface of the wing 21, the duct being closed at opposite sides by inwardly facing surfaces of the end plates. If such a duct were to be formed, when the lower edges of the plates 23 left ground level G, the relatively high pressure within the duct would flow outwardly and sidewardly, creating a marked and sudden increase in induced drag, with undesirable consequences. Accordingly, the requirement for clearance between the lower edges 23b of the end plates and the ground G is important to avoid sudden and radical increases in induced drag following from slight changes in elevation of the wing 21 relative to the ground.

The ground effect is however important in enhancing the low speed stability of the aircraft 20 about its roll axis during take off and landing. Thus, if, in the ground effect, one of the lower edges 23b of the pair of end plates is higher or lower than the other lower edge 23b, the higher pressure air will tend to escape in the direction of the higher wing tip, thus reducing the impact pressure on the lower surface at that wing tip until the pressure is equalized at both wing tips.

FIGURE 5 shows an aircraft 40 that embodies many of the principles of the aircraft 20 of FIGURE 1 but which is operational at higher altitudes than the aircraft 20. The low aspect ratio flying configuration permits a structural rigidity and integrity that is well adapted for the rigors of super-sonic flight. The aircraft 40 has a higher altitude capability than the aircraft 20 by virtue of a cascade series of relatively higher aspect ratio airfoils, together defining the top of the flying wing as a whole. As in the aircraft 20, engine air intakes comprising spanwise scoop openings separate the cascade stages but are controllable as to height for suitable adjustment as the aircraft accelerates from subsonic to hypersonic flight and, also, for take off and landing stages.

The aircraft 40 has a wing fuselage 41 of rectangular planform and an aspect ratio of approximately one. As shown in FIGURE 6, the wing 41 does not have swept back leading edges but, rather, has a leading edge 42 normal to the line of flight, as is also a trailing edge 43. Unlike the wing 21 of the aircraft 20, the wing 41 is without dihedral and the bottom and top profile shown in FIGURE 7 may be basic to all sections of the wing. This profile has a maximum thickness preferably less than 15% of the length of a chord 44 of a continuous bottom surface 45. The upper surface of the wing 41 may only roughly be visualized as continuous in profile, as it is made up of a cascade series of airfoil surfaces 46, 47 and 48. The airfoil surfaces 47 and 48 are adjustable longitudinally on complementarily shaped top surfaces of sections 49 and 50, respectively, of the wing 41. The surface 48 has its trailing edge merging slightly reflexly with the exposed top portion of the wing structure 50 to complete the top profile of the wing 41.

The aircraft 40 has a pair of opposite end plates 51 whose profile corresponds to the profile of the wing 41 in the same manner as the end plates 23 of the aircraft 20 correspond to their associated wing 21. Thus, the end plates 51 have leading edges 51a which may be positioned forwardly of the leading edge 42 of the wing 41, on an extension of the chord 44. Lower edges 51b of the end plates 51 have an enlarged profile relative to the lower surface 45 of the wing 41. Upper edges 51c of the plates 51 are generally similar to the profile of the leading top airfoil surface 46 and then develop rearwardly and upwardly away from the surfaces 47, 48 and 50 to optimize the mean vertical span of the end plates 51. The end plates continue rearwardly beyond the trailing edge 43 of the wing 41 and at their rear ends along the upper edges 51c are interconnected by a horizontal stabilizer 52. The stabilizer is preferably mounted for movement independently of a pair of elevons 53, comprising the trailing edge of the horizontal stabilizer and, in turn, carrying trim tabs 54. A pair of relatively large rudders 55 comprise portions of the trailing edges of the end plates 51 and, in turn, mount rudder trim tabs 56.

The aircraft 40 has two banks of turbojet engines 57. Illustratively, a pair of such engines have been shown as mounted relatively forwardly in the wing 41 and four such engines are shown mounted relative rearwardly. Obviously, the number and precise placement of such engines, both in the forward bank and rear bank, must, in practice, take into account the desired location of the center of gravity of the aircraft, as well as their distinct purposes. It is to be assumed that the distribution of fuel and payload in the forward relatively deep portions of the wing 41, compensate for the apparent imbalance indicated by the illustrative engine placement of FIGURE 6.

The forward pair of engines 57 have a thrust axis inclined forwardly and upwardly to provide both a forward and upward component of thrust. Each of this pair of engines takes air from one of a pair of ducts 58 which ducts have a common scoop opening or intake 59 defined between a spanwise portion of the leading airfoil 46 and a leading edge portion 60 of the immediately trailing airfoil 47.

The forward pair of engines 57 have exhaust ducts 61 aligned with the thrust axes of the engines and exhausting through the bottom surface 45 of the wing 41. The surface opening of each of these exhaust ducts 61 is provided with a series of louvers 62 having rotational axes normal to the line of flight and controllable (by means not shown) for co-movement to vary their positions between fully closed and substantially flush with the bottom surface 45, and varying degrees of inclination to deflect the exhaust of the engines 57, either substantially vertically downwardly, or rearwardly.

The rear bank of four engines 57 is mounted with substantially horizontal thrust axes and each of these engines takes combustion air from one of a series of ducts 63 and 64 all of which ducts have a common scope intake opening 65 defined between a spanwise portion of the airfoil surface 47 and a leading portion 66 of the airfoil surface 48.

As is apparent, the forward bank of engines 57 is adapted to provide primarily vertical thrust to augment the aerodynamic lift, or to provide both a lift component and forward thrust, or to provide primarily forward thrust. The rear bank of engines 57 is adapted solely to provide forward thrust. Thus, for takeoff, the louvers 62 are moved to substantially vertical positions. Then, when all engines are in operation, the high lift characteristic of the wing 41, provided by the boundary layer control and the cascade series of upper airfoil surfaces, is augmented by the vertical thrust components of the forward pair of engines 57. The takeoff roll is thereby reduced and a steep gradient climb is attained. When a cruising altitude has been reached the forward bank of engines 57 can be throttled back, the ram intake 59 is restricted, and the louvers 62 moved towards the closed position leaving only sufficient opening area to properly remove the exhaust gases from the nozzles 61. The forward engines 57 then produce a forward thrust, due to the deflection by the louvers 62, but remain in operation to effect boundary layer control over the leading airfoil surface 46.

The scoop intake openings 59 and 65 are of variable geometry to accommodate the particular phases of operation of the engines. Means for varying the size of the opening 65 is illustratively shown in FIGURES 8, 9 and 10 and it is to be understood that the same type of mechanism is utilized for adjusting the size of the opening 59.

The airfoil section 48 and its leading edge portion 66 are movable forwardly and rearwardly on the wing 41 and the leading edge portion 66 is movable towards and away from the surface immediately forward thereof. The extremes of the permissible range of movement for the leading edge 66 are shown in the solid and phantom outline positions of these parts in FIGURE 8. The leading edge 60 is preferably capable of fully closing the intake 59 so that the louvers 62 can be fully closed and the forward engines 57 can then be turned off.

Specifically, the leading edge portion 66 has a rear edge with a mating radius engagement at 67 with the front edge of the member providing the surface 48. The front edge of the surface 48 member has a plurality of pockets 68 formed therein and a pair of rods 69, one on the center of the radius 67, extend spanwise through the member to have opposite ends received in a guide 70 on the inner faces of the pair of end plates 51. As is shown in FIGURE 9, each end of the forward rod 69 extends through the channel shaped guide 70 and is drivingly connected to an end of a push rod 71. The push rod, and an actuating fluid cylinder 72 operatively associated therewith, are mounted inside of the end plate 51 and the pair of cylinders 72 are of the double acting type to move the airfoil surface 48 and its leading edge portion 66 forwardly and rearwardly. To compensate for the arcuate path of movement of the airfoil surface 48, the push rod 71 has a pivotal driving connection to the shaft 69 and the double acting cylinder 72 has a pivotal connection 73 at one end within the plate 51.

The leading edge portion 66 has a plurality of bars 74 secured therein to extend rearwardly into the pockets 68, these bars being pivotally mounted on the shaft 69. Rear ends of bars 74 have a pivotal connection with a piston rod 75 of a remotely controllable double acting fluid cylinder 76 that is pivotally connected to a sidewall portion of the pocket 68, as indicated at 77. As is shown in FIGURE 8, the bar 74 is angularly related to the piston rods 75 and as the distance between the shaft 69 and the pivot connection at 77 is constant, movement of the piston rods 75 causes the leading edge portion 66 to move downwardly when the piston rod is extended and upwardly when the piston rod is retracted.

The ducts 64 and 58 are of appropriate supersonic diffuser configuration. In the aircraft 40, the ducts 58 and 64 are adapted to meet the airflow demand of the engines 57 at cruising speeds when the leading edge portions 60 and 66 have their surfaces 47 and 48, respectively, in rearmost positions. The size of the inlet openings 59 and 65, when the leading edge portions 60 and 66 are in rearmost conditions, is thus too great for less than design speeds, or cruising speed. Accordingly, at less than cruising speed either or both of the leading edge portions 60 and 66 may move forwardly, and downwardly if necessary, so that excess air need not be handled by the ducts 58 and 64. Additionally, the adjustability of these leading edge portions insures a dependency of the engines 57 on boundary layer air, so as to insure constant removal of the boundary layer so as to maintain the high lift characteristic of the wing 41.

As has been noted, the horizontal stabilizer 52 is movably mounted and the rudders 55 are relatively large in area to adapt them for controlling the aircraft 40 at extreme altitudes. To provide additional control about the pitch axis, a streamlined deflector 78 is mounted between the end plates 51 behind the rear bank of engines 57. This deflector is pivotally supported on a suitable shaft 79 extending longitudinally through the deflector 78, at a forward chord position, so that portion of the deflector behind the shaft 79 provides a longer level arm than that portion forwardly of the shaft. The shaft is situated in the plane of the axes of the exhaust nozzles of the rear engines 57. The deflector 78 is held in the neutral position, indicated in solid outline in FIGURE 7, and, preferably, is not brought into play as a pitch control except at extreme altitudes where the horizontal stabilizer 52 and elevons 53 may tend to be sluggish. Then the deflector 78 can be turned up or down to lower or raise, respectively, the nose of the aircraft 40, and so augment the response expected from the horizontal stabilizer. While the deflector axis at 79 is relatively close coupled with respect to the exhaust nozzles of the rear bank of engines 57, a sufficiently long couple is provided relative to the aerodynamic center of the wing 41 to make the deflector action immediate and positive.

An additional boundary layer control, utilizing the exhaust from the rear bank of engines 57, is incorporated in the aircraft 40 in the form of an augmenter panel 80. The panel is disposed above the exposed airfoil surface of the wing top structure 50, being secured at opposite ends to the plates 51, to define a duct of uniform cross-sectional area with the airfoil 50. The panel 80 has a leading edge 81 positioned aft of the line of center of pressure developed by the air foil comprising the surfaces 48 and 50 and has a trailing edge 82 extending rearwardly at least to the plane of the ends of the exhaust nozzles of the engines 57. The leading edge 81 may be at the level of the local thickness of the boundary layer of the airfoil thereunder but the gap can be greater, as in FIGURE 7, as the size of the gap is primarily determined by the degree to which the wake of the exhaust from the rear bank of engines 57 lowers the pressure at the exhaust end of the duct.

In FIGURES 11 and 12, the invention is shown as embodied in a more conventional configuration. An aircraft 90 has a conventional tubular and elongated fuselage 91, relatively high aspect ratio wing 92, vertical stabilizer 93 and horizontal stabilizer 94. Conventional aerodynamic controls are provided in the form of a pair of ailerons 95, rudder 96 and elevators 97.

In the wing 92, the lift distribution tends to decrease progessively along the span from the root of the wing to the tips. The midportions of the wing 92 thus contribute most, per unit area, to the lift of the wing. However, the same mid portions, because of their greater chord length, are the most subject to boundary layer deceleration and separation.

To prevent boundary layer separation in the mid portions of the wing 92, the aircraft 90 has engines mounted behind the wing in an airfoil engine nacelle structure. As in the previously described embodiments of the invention, the engine intake air includes the boundary layer of the mid portions of the wing 92. The airfoil profile of the engine nacelle itself produces lift and additional boundary layer control on the upper camber of the nacelle is provided by an exhaust duct structure of the engines.

More specifically, a pair of elongated plates 98 are attached at forward end portions, in planes substantially normal to that of the wing 92 and parallel to the direction of flight, at equal stations of the opposite halves of the wing. Between each of the plates 98 and the fuselage 91, the under surface of the wing 92 extends rearwardly to the rear end of the plate 98 to produce a continuous bottom camber 99. The end plates 98 have a leading edge 98a projecting forwardly beyond the leading edge of the wing 92 at that station and have a bottom edge 98b that is similar to the bottom camber 99 of the combined engine nacelle and wing structure in profile, but spaced downwardly therefrom.

The upper surface of the engine nacelle structure, on each side of the fuselage 91, comprises a first forwardly disposed airfoil 100 and a second trailing airfoil 101. Each of these airfoils extends between the corresponding plate 98 and the corresponding side of the fuselage 91. Within the engine nacelle structure and on each side of the fuselage 91, a pair of turbojet engines 102 is mounted beneath the trailing edge portion of the airfoil 100. Air for the engines 102 is taken in through a duct 103 of suitable configuration provided beneath the forward portion of the airfoil 100. As is shown in FIGURE 11, each airfoil 100 has a leading edge 104 which may be swept back generally like the corresponding leading edge of the basic wing 92 and illustratively positioned at about the 60% chord line of the wing 92. As the leading edge 104 is spaced above the upper profile of the wing 92, a scoop type intake 105 is defined, horizontally, between the inner surface of the plate 98 and a side of the fuselage 91 and, in vertical dimension, between the leading edge 104 of the airfoil 100 and the upper surface of the wing 92.

In the rear of the engine nacelle structure, an exhaust passage 106 is defined for each pair of engines 102 beneath the airfoil 101. To accelerate the boundary layer of air flowing over the airfoil 100, the airfoil 101 has a leading edge 107 defining a restricted intake opening 108 with a spanwise portion of the airfoil 100 and leading into a passage 109 that exhausts into the duct 106.

As is shown in FIGURES 11 and 12, in the aircraft 90 the invention produces a composite wing structure comprising the combination of the high aspect ratio wing 92 and the engine nacelle and airfoil structure. That portion of the total wing structure, between the pair of plates 98, resembles the low aspect ratio wing structure of the first mentioned aircraft 20, for example. Thus, in the total wing structure bounded by the plates 98 there is a continuous bottom surface, such as is indicated by the chamber 99 in FIGURE 12, and centrally longitudinally bisected by the fuselage 91. The upper composite airfoil surface of the low aspect ratio wing portion is centrally longitudinally divided by the fuselage 91 and consists of the upwardly exposed portion of the high aspect ratio wing 92, the exposed portion of the airfoil 100, and the airfoil 101. The plates 98 have an upper edge 98c of gradually sloping profile that extends above corresponding portions of the wing 92, airfoil members 100 and airfoil members 101.

In the operation of the aircraft 90, laminary boundary layer flow across the exposed portion of the upper camber of the wing 92 is maintained and boundary layer separation avoided, so as to improve the lift characteristics of the wing 92, in the same manner as described with reference to the aircraft 20. Thus, air for the engines 102 is sucked in through the intake opening 105, and the leading edge 104 is in such proximity to the upper camber of the wing 92 as to insure the removal of the boundary layer as a portion of the combustion air.

Referring particularly to FIGURE 12, it will be noted that the ram intake opening 108 is relatively small, in vertical extent, as compared to the intake opening 105, although extending spanwise throughout the engine nacelle structure, just as does the opening 105. As the engines 102 exhaust into the duct 106, air flowing over the surface of airfoil 100 is sucked through the sized opening 108 into the passage 109 to be exhausted from the duct 106 with the engine exhaust gases. As the intake 108 is reduced in area relative to the cross-sectional area of the passage 109, to define a venturi throat, the air flowing over the surface of airfoil 100 is accelerated. The leading edge 107 is positioned relative to the overall chord length of the airfoil 100, so as to be disposed forwardly of the boundary layer separation point on the airfoil 100, the separation point being a function of the designed speed of the aircraft 90 and the profile of the airfoil 100. In the specific instance of FIGURE 12, if it be assumed that the thickness of the boundary layer on the surface of airfoil 100 at the leading edge 107 be on the order of $15/100$ of an inch, the leading 107 is made sharp and preferably positioned at the boundary layer limit. With this arrangement, the induction of the relatively cold boundary layer air into the exhaust duct 106, for mixing with the gases exhausted by the engines 102, is held to a minimum.

FIGURE 13 shows an orbital vehicle or flying wing 120 embodying the invention. This vehicle has a wing fuselage 121 which, overall, is of extremely low aspect ratio, on the order of 0.4. The vehicle 120 is adapted for acceleration from rest by air breathing engines to climb rapidly to the fringe of the sensible atmosphere while attaining hypersonic velocity, after which a rocket boost launches the vehicle into orbital flight and the air breathing engines are turned off. The vehicle 120 has a reaction or retrojet control system to orient it as desired while in orbital flight, as well as an aerodynamic control system for guidance when it is lifted into orbit and to descend as a lifting re-entry vehicle. While not shown, a retro-rocket system may be employed to initiate to descent of the vehicle 120. However, after the vehicle 120 has descended to the fringes of the sensible atmosphere, the aerodynamic control system and the high lift/ high drag profile of the vehicle as a whole achieve a controlled rate of descent and a guidance to a selected landing field.

The wing fuselage 121 has a smoothly continuous bottom surface whose basic profile 122 is best seen in FIGURE 15. A chord line 123 has been shown in FIGURE 15 as a reference line or plane for the bottom profile 122, but, as with the other embodiments, this line is not to be taken as a mean camber line. Within the wing 121, a series of six engines are mounted, comprising, first, a bank of two turboram engines 124, secondly, another bank of two turboram engines 124 and, thirdly, in the trailing portion of the wing fuselage, a bank of a pair of ram jet engines 125. As is shown in the plan view of FIGURE 14, the engines of each pair are equally spaced on opposite sides of the longitudinal axis of symmetry.

Referring again to FIGURE 15, it will be seen that all of the three pairs of engines have their thrust axes slightly inclined positively, relative to the chord line 123. The under surface 122 of the wing has two pairs of concave depressions 126 and 127, each of which is configured to comprise a cylindrically incomplete, downwardly concave extension of the jet nozzle of the corresponding engine 124. The under surface of the wing thus departs from the typical profile 122 in these areas. Each of these concavities 126 and 127 has a flush-mounted, matingly configured deflected plate 128 or 129, each of which is connected to the fuselage 121 for winging movement on an horizontal axis normal to the line of flight, near the forward end of the plate, in order to be moved to the phantom outline positions indicated. When the deflectors 128 and 129 are in the raised positions shown in solid outline, they are flush with the corresponding concave passage 126 or 127 and do not affect the exhaust of the corresponding engine. When the plates 128 and 129 are moved to the lowered phantom line positions, the exhaust of the engines 124 is deflected downwardly so that the engines operate to thrust the aircraft 120 upwardly as well as forwardly.

The top surface of the wing 121 is defined by a cascade series of airfoils. These are identified from front to rear consecutively by the numerals 131 to 137, both inclusive. While the aircraft wing 121, overall, has a very low aspect ratio, if reference is made to FIGURE 14 it will be seen that the exposed cambered area of each of these airfoils, considered individually, is a relatively high aspect ratio. Accordingly, considered individually, each of the airfoils has a lesser induced drag and all of the airfoils together have a lesser total induced drag than would be expected if the upper surface of the wing 121 were to be conventionally continuously smoothly cambered.

The leading airfoil 131 has a swept leading edge defined by a nose ball 140 and a pair of relatively small radius cylindrical members 141. The nose ball 140 is mounted on the longitudinal axis of the wing 121 for oscillation or rotation and the members 141 are also mounted for rotative movement. The ball and the members 141 are adapted to be either internally or externally cooled by a suitable coolant medium, while moving, as a means of dissipating heat encountered during descent. In this cooling means, the members 141 and the ball 140 preferably take the form of the invention of John P. Le Bel in co-pending patent application, Serial No. 4,388, now Patent 3,062,148. The wing 121 has a pair of end plate structures 143 having leading edges defined by rotatable disc members 145 and 146, respectively, and these discs are also cooled by the aforementioned invention of John P. Le Bel.

In the aircraft 120, the leading edges of the endplates 143, as defined by the rotatable discs 145 and 146, do not project forwardly of the leading edge of the tip sections of the wing and, instead, coincide with the leading edge of the tip sections as shown in FIGURE 13. The pair of end plates have bottom and lower profiles indicated by the subscripts $a$ and $b$ respectively, both end plates having the profiles indicated in FIGURE 15. Thus, the bottom profile 143$a$ tapers rearwardly from the leading edge disc 145 to develop gradually away from the bottom profile 122 of the tip wing sections. The top profile 143$b$ tapers similarly upwardly and rearwardly away from the nose disc 145 and above the composite top surface of the wing 121. The end plates extend rearwardly beyond the wing 121 and along their upper edges support a pair of elevons 147 to produce aerodynamic pitch and roll control. Yaw control is provided by a pair of rudders 148 comprising trailing edge portions of each end plate at the top and bottom of the trailing edge.

As is shown in FIGURE 13, each of the end plates 143, on its external vertical face, is formed with a longitudinally extending and empirically determined area rule depression 150. In the rear portions of the end plates, a pair of rocket motors 151 are housed with their longitudinal axes in the vertical chord plane 152 of the corresponding end plate and, also, in the chord plane 123 of the wing 121, as is indicated in FIGURE 15. The rocket housings are formed integrally with the end plates and on the exterior faces of the end plates have nose portions faired into the corresponding area rule depression 150. The pair of rockets 151 thus have their thrust axes adapted for driving substantially parallel to the longitudinal axis of symmetry and preferably in about the line of aerodynamic flight.

The turbo ram engines 124 operate in much the same manner as the turbo jet engines in the previously described embodiments of the invention, to exercise boundary layer control and to provide high lift. However, to insure the maintenance of boundary layer control in the very long aircraft 120, it is desirable to reduce, as much as possible, the length from the leading edge of each air foil to the engine intake scoop, in effect reducing the aspect ratio of the exposed airfoil surface. Accordingly, in the aircraft 120 a ducting system has been employed whereby each engine sucks boundary layer air from a pair of airfoils. Thus, each of the pair of engines 124 in the leading bank is supplied with combustion air through a pair of ducts 153 and 154. The duct 153 is defined between the structure of foremost airfoil 131 and the succeeding rearward structure of the airfoil 132, and has a scoop inlet 155 defined between the leading edge of the airfoil 132 and the foremost airfoil 131. The duct 154 is defined between the airfoils 133 and 132 and, similarly, has a scoop intake 156 defined under the leading edge of the airfoil 133. In the same fashion, a pair of ducts 157 and 158, with corresponding ram intakes 159 and 160, respectively, are defined by the structures of the airfoil members 135, 134 and 133, and by the leading edges of the airfoils 135 and 134.

Combustion air for the ram jet engines 125 is provided in substantially the same fashion, there being a pair of ducts 161 and 162, and corresponding scoop intake openings 163 nad 164, defined by the structures of the airfoils 137, 136 and 135, and by the leading edges 137 and 136. As is shown in FIGURE 13, all of the airfoil sections, except the airfoil section 137 may have a plurality of longitudinally extending flow control fins 165 extending into the associated duct. In each case, these fins preferably commence at a point spaced rearwardly from the leading edge of their airfoil, at zero elevation relative to the airfoil, and gradually increase in vertical dimension to eventually match the vertical dimension of the scoop opening. If desired, some of the fins may extend into the duct.

In addition to the aerodynamic control system, the vehicle 120 preferably has two sets of reaction jet controls. Thus, each of the end plates 143, towards the rear of the vehicle, and in opposite edges, has a pair of upwardly and downwardly pointing jet orifices 167 and 168, and a pair of laterally outwardly directed orifices 169, corresponding sets of orifices, similarly identified, are also provided in the forward portions of each endplate 143 and 144, but indicated by the subscript a. In an environment where the aerodynamic controls are ineffective, either or both of the forward and rear sets of reaction jet controls may be employed to control the attitude of the vehicle 120. Thus, in orbital flight, control about the pitch axis of the vehicle 120, for example to nose up, may be achieved by simultaneously actuating the rear pair of upwardly pointing jets 167 and the forward pair of downwardly pointing jets 168a. Conversely, simultaneous action of the rear pair of downwardly pointing jets 168 and of the forward upwardly pointing jets 167a will cause nosing down. Analogously, yaw control may be achieved by simultaneously actuating the jets 169 on one side of the craft with the jets 169a on the other side of the craft. In the same fashion, roll control is achieved by actuating a jet 168 and a jet 168a on the lower edge of one of the end plates while simultaneously actuating the jets 167 and 167a, of the upper edge of the other end plate. However, this is merely by way of illustration as no claim is made herein to the particular system of jet reaction control.

Additional control about the pitch and yaw axes is provided by an arrangement of deflector flaps against which the exhaust of the ram jet engines 125 reacts. Referring to FIGURE 15, the trailing edge portion of the last airfoil 137 comprises a flap 170 and, similarly, the trailing edge of the under surface 122 comprises a hinged flap 171. A pair of deflector plates 172 for each of the ram jet engines 125 is mounted on vertical hinge axes on a rear end wall 173 of the wing fuselage 121. These plates are of semi-ovoid configuration tapering rearwardly to a rounded apex to provide clearance for the horizontal flaps 170 and 171, which are co-movable upwardly and downwardly to deflect the exhause of the engines 125 upwardly or downwardly, respectively. Referring to FIGURE 17, it will be seen that the deflector plates 172 of each pair are mounted on opposite sides of the exhaust nozzle of each engine 125, the ends of the nozzles terminating in the plane of the rear end face 173 of the fuselage. The four deflector plates 172 are co-movable in the same direction to deflect the jet exhaust to the left or the right. Thus, the horizontal flaps 170 and 171 can be manipulated to exercise control about the pitch axis while the deflector plates 172 are swingable to exercise control about the yaw axis.

Turbo ram engines are effective from ground level to approximately 85,000 feet altitude at flight speeds up to the vicinity of Mach 3 and ram jet engines are efficient at speeds of Mach 3 to Mach 8 and can take over from turbo ram engines up to an altitude of approximately 120,000 feet, above which altitude reliance must be placed on rocket propulsion. In the operation of the air vehicle 120, the turbo ram engines 124, ram jet engines 125 and rockets 151 are successively operated within their corresponding flight envelopes, as indicated just above. Thus, at takeoff the deflectors 128 and 129 are moved to the downwardly pointing positions indicated in FIGURE 15. Then, the turbo ram engines 124 are placed in operation and a relatively short run take off and a steep gradient climb of the vehicle 120 are achieved because of the high lift characteristics of the wing 121, the deflected thrust achieved by the plates 128 and 129, and the attitude of the engines relative to the reference line 123. The vehicle 120 is constantly maintained in a climbing attitude by the aerodynamic control system until the velocity and altitude limits of the flight envelope of the turbo ram engines 124 is reached, i.e., the vicinity of Mach 3 at an altitude of about 80,000 feet. Then the ram jet engines 125 take over to accelerate and lift the vehicle 120 to the velocity and altitude limits of the flight envelope of the ram jet engines, i.e., the vicinity of Mach 8 at approximately 120,000 feet. During this phase, since the brunt of the so-called "thermal thicket" is primarily borne by the leading edges of the vehicle, the nose ball 140, members 141 and discs 145 may be operated to control the heating. In this connection, the leading edges of the top airfoils and horizontal stabilizer may also comprise rotatable and coolable members.

The rockets 151 may be solid or liquid fuel and, in the latter even the wing fuselage 121 provides ample fuel capacity. In either event, when the limit of the turbo ram flight regime is reached and, preferably, just before the rate of acceleration of the vehicle 120 decreases, the pair of rockets 151 are ignited and the engines 124 and 125 turned off, and the vehicle is then carried into orbit.

When the vehicle 120 descends, either because of orbital decay or because of the actuation of retro-rockets, the retro-jet control system may be actuated either to place the vehicle 120 in a gliding attitude or to cause descent of the vehicle in an attitude in which the vehicle descends bottom first. In the latter event, the vehicle has a ballistic path with the bottom surface 122 of the vehicle taking the impact. As the area of the bottom surface is very large, the unit heating rate is decreased and an ablative coating may be incorporated in the bottom surface to protect the vehicle, if desired. In the former event, and in any event, when the vehicle has lowered into the sensible aerodynamic atmosphere, the rate of descent is relatively low because of the high lift characteristics of the upper surface of the wing 121 so that maximum heating is encountered in the relatively low density upper atmosphere. The rate of deceleration may be controlled at extreme altitudes because the vehicle has extreme altitude aerodynamic capability and controllability. When the vehicle is in gliding attitude the ball 140, cylindrical members 141 and discs 145 may be actuated and the cooling operated.

During this gliding regime and deceleration, even though the engines 124 and 125 are inoperative, the relatively high aspect ratio characteristics of the airfoil members 131 to 137, inclusive, will produce a desired high lift because the engines 124 are conventionally provided with bypasses so that the corresponding ducts for these engines are not blocked and will permit the passage of air. Similarly, the ram jet engines 125 will bypass air even though the vehicle is gliding.

When the vehicle 120 has descended to an altitude at which the aerodynamic controls are fully effective, and vehicle speed has been reduced to the point where aerodynamic heating is no longer a problem, the turbo ram engines 124 are again ignited so that the craft can be flown to a selected landing point. In this regime of flight, especially if supersonic rather than subsonic, the boundary layer control effected by the operation of the engines prevents the creation of excessive heat from aerodynamic friction, as the boundary layer flow is maintained in a laminar condition.

It will be apparent that many changes may be made in the embodiments above set forth and, also, it is possible to devise many varying combinations of the features described, other than the combinations specifically described with reference to each particular embodiment. Accordingly, it is to be understood that the matter set forth above and shown in the accompanying drawings is to be interpreted as illustrative, and not in a limiting sense.

We claim:

1. A flying wing airplane comprising a wing having a pair of plates affixed to opposite ends in substantially chordwise relationship to said wing, each of said plates having a chordwise length at least as great as the chord length of the corresponding end stations of said wing and having a bottom profile lower than the bottom of the profile of said wing at said end stations, said wing having a top surface comprising a plurality of airfoil surfaces having together the same span as said wing and each adapted and arranged to define a ram air intake between a leading edge of a trailing one of said airfoil surfaces and a spanwise trace of a preceding airfoil surface, in a chord position of said preceding airfoil surface behind the line of center of pressure of said preceding airfoil surface by locating said leading edge substantially above the rearwardly projected contour of said preceding airfoil surface, and duct means in said wing for inducting engine combustion air from said intake to an air breathing engine, said trailing airfoil surface being movable relative to said top surface of said wing to vary the proximity of the leading edge of said trailing airfoil surface to said preceding airfoil surface whereby to adjust the size of the frontal area of said intake.

2. An airplane as defined in claim 1 in which said leading edge portion of said trailing airfoil surface is vertically adjustable relative to said trailing airfoil surface to vary the camber of said trailing airfoil surface while changing the size of the intake opening.

3. A flying wing comprising a wing having a pair of plates affixed to opposite ends of said wing in substantially chordwise relationship to said wing, each of said plates having a bottom profile lower than the bottom of the profile of said wing at the station of said plates, said plates having a top profile of greater camber than a top surface of said wing and said plates having trailing edges spaced rearwardly of the trailing edge of said wing, yaw control means and pitch control means supported on the trailing edges of said plates in positions spaced behind said wing, said top surface of said wing having a ram air intake extending spanwise between said plates and defined between a leading edge of a trailing airfoil surface and a spanwise portion of a preceding airfoil surface, said leading edge of said trailing airfoil surface being positioned forwardly of the line of separation of boundary layer air flowing on said preceding airfoil surface and being spaced substantially above the rearwardly projected contour of said preceding airfoil surface, duct means in said wing to induct air from said intake into said wing, and means in said wing for sucking air from said duct whereby to remove boundary layer air from said preceding airfoil.

4. A flying wing airplane comprising a wing having a pair of panels on opposite tips in chordwise relation to said wing, said plates having a bottom profile lower than the bottom of the profile of said wing at end stations of the wing, said wing having a top surface comprising a plurality of airfoil surfaces of combined span equal to the span of the bottom surface of said wing and each of lesser aspect ratio than said bottom surface, said top surface of said wing having a pair of spanwise ram air intakes spaced longitudinally of said wing for a pair of engine air intake ducts disposed within said wing, each of said intakes extending spanwise of said wing and being defined between a leading edge of a trailing airfoil surface and a spanwise portion of a preceding airfoil surface, at least one jet engine adapted and arranged to ingest air from the foremost of said intakes and having an upwardly directed thrust axis, said engine having a downwardly directed exhaust nozzle, exhausting through an opening formed in said bottom surface of said wing, adjustable means in said opening in said bottom surface for selectively deflecting the exhaust of said engine downwardly or rearwardly, and at least one jet engine adapted and arranged to ingest air from the rearmost of said intakes and having a rearwardly directed exhaust nozzle.

5. An airplane as defined in claim 4 in which said end plates have a top edge spaced above the top surface of said wing and terminating in trailing edges spaced rearwardly beyond the trailing edge of said wing, said end plates being bridged by a horizontal deflector pivotally supported at opposite ends by said end plates to confront said rearwardly directed exhaust nozzle, said deflector being streamlined and having its pivot axis at a forward chord position thereof and being selectively movable to deflect exhaust gases from said nozzle upwardly or downwardly to exercise control about the pitch axis of said airplane.

6. A flying wing as defined in claim 3, said top surface of said wing comprising a cascade series of airfoils, adjacent pairs of said airfoils having the leading edge of one airfoil positioned above a spanwise portion of a preceding airfoil and adapted to define a ram air intake for sucking boundary layer air from said preceding airfoil, means including an engine for ingesting air from said intake, and rocket means carried by said wing and having a thrust axis substantially paralleling the longitudinal axis of symmetry of said wing.

7. A flying wing as defined in claim 3, said top surface comprising a plurality of airfoils, each of which airfoils having a distinct line of center of pressure, adjacent pairs of said airfoils having a leading edge of one airfoil positioned above a preceding airfoil to define a ram air intake with a spanwise portion of said preceding airfoil at a position aft of the line of center of pressure of said preceding airfoil, a plurality of engines within said wing, each of which engines having an inlet duct associated therewith communicating with a ram air intake for ingesting air into said engine, and rocket means carried by said wing having a thrust axis substantially paralleling the longitudinal axis of symmetry of said wing.

8. A vehicle as set forth in claim 7 in which a plurality of said ram air intakes are defined by a plurality of pairs of said airfoils, each of said engines having a plurality of ducts for ingesting air from a pair of said intakes.

9. A vehicle as set forth in claim 7 in which each of said engines has its thrust axis inclined upwardly and forwardly relative to the chord plane of the bottom surface of said wing whereby said engines thrust upwardly as well as forwardly.

10. A vehicle as set forth in claim 7 in which the bottom surface of said wing mounts a means behind an exhaust nozzle of each of said engines for selectively deflecting the exhaust from said engines downwardly and rearwardly.

11. A vehicle as defined in claim 7 in which said rocket means comprises a pair of rockets each of which rockets has a housing formed integrally with one of said end plates, each of said rockets having its thrust axis substantially coincident with the intersection of the vertical median plane of said end plate and the chord plane of the bottom surface of said wing.

References Cited by the Examiner

UNITED STATES PATENTS

| | | |
|---|---|---|
| 2,447,100 | 8/48 | Stalker. |
| 2,464,663 | 3/49 | Zingg _____ 244—12 |
| 2,466,466 | 4/49 | Morrisson _____ 244—42.41 |
| 2,639,874 | 5/53 | Stalker _____ 244—42.41 |
| 2,809,793 | 10/57 | Warner _____ 244—42.41 |
| 2,821,351 | 1/58 | Utgoff _____ 244—42.41 |
| 2,964,264 | 12/60 | Multhopp _____ 244—42.41 X |
| 2,989,269 | 6/61 | Le Bel _____ 244—12 |
| 3,023,981 | 3/62 | Reiniger _____ 244—15 X |

FOREIGN PATENTS

| | | |
|---|---|---|
| 472,591 | 4/51 | Canada. |
| 650,710 | 2/51 | Great Britain. |

OTHER REFERENCES

Page 337 of "Jane's All the World's Aircraft," 1957–1958 published by Jane's All the World's Aircraft Publishing Co., London, England.

FERGUS S. MIDDLETON, *Primary Examiner.*

EMILE PAUL, MILTON BUCHLER, *Examiners.*